(12) United States Patent
Shao et al.

(10) Patent No.: US 11,367,222 B2
(45) Date of Patent: Jun. 21, 2022

(54) THREE-DIMENSIONAL SHAPE CLASSIFICATION AND RETRIEVAL USING CONVOLUTIONAL NEURAL NETWORKS AND MAJORITY VOTE

(71) Applicant: Hewlett-Packard Development Company, L.P., Spring, TX (US)

(72) Inventors: Ruiting Shao, Mountain View, CA (US); Yang Lei, Palo Alto, CA (US); Jian Fan, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 93 days.

(21) Appl. No.: 16/975,411

(22) PCT Filed: Apr. 20, 2018

(86) PCT No.: PCT/US2018/028658
§ 371 (c)(1),
(2) Date: Aug. 25, 2020

(87) PCT Pub. No.: WO2019/203851
PCT Pub. Date: Oct. 24, 2019

(65) Prior Publication Data
US 2021/0104071 A1  Apr. 8, 2021

(51) Int. Cl.
*G06T 7/00*  (2017.01)
*G06K 9/62*  (2022.01)
(Continued)

(52) U.S. Cl.
CPC .............. *G06T 7/97* (2017.01); *G06K 9/627* (2013.01); *G06K 9/628* (2013.01); *G06N 3/04* (2013.01);
(Continued)

(58) Field of Classification Search
None
See application file for complete search history.

(56) References Cited

U.S. PATENT DOCUMENTS 9,767,410 B1 *  9/2017  Guevara .................. G10L 15/16
9,767,557 B1    9/2017  Gulsun et al.
(Continued)

FOREIGN PATENT DOCUMENTS

WO   WO-2018051336 A1   3/2018

OTHER PUBLICATIONS

Aakerberg, Andreas, et al. "Improving a Deep Learning based RGB-D Object Recognition Model by Ensemble Learning." In 2017 Seventh International Conference on Image Processing Theory, Tools and Applications (IPTA), pp. 1-6. IEEE, 2017.
(Continued)

*Primary Examiner* — Frank S Chen
(74) *Attorney, Agent, or Firm* — HP Inc. Patent Department (57) ABSTRACT

A deep learning method employs a neural network having three sub-nets to classify and retrieve the most similar 3D model of an object, given a rough 3D model or scanned images. The most similar 3D model is present in a database and can be retrieved to use directly or as a reference to redesign the 3D model. The three sub-nets of the neural network include one dealing with object images and the other two dealing with voxel representations. Majority vote is used instead of view pooling to classify the object. A feature map and a list of top N most similar well-designed 3D models are also provided.

15 Claims, 9 Drawing Sheets

(51) Int. Cl.
*G06N 3/04* (2006.01)
*G06N 3/08* (2006.01)
*G06T 17/00* (2006.01)

(52) U.S. Cl.
CPC ............... *G06N 3/08* (2013.01); *G06T 17/00* (2013.01); *G06T 2207/20081* (2013.01); *G06T 2207/20084* (2013.01)

(56) References Cited

U.S. PATENT DOCUMENTS

| | | |
|---|---|---|
| 10,776,685 B2 * | 9/2020 | Lin ........................ G06K 9/627 |
| 2016/0259994 A1 | 9/2016 | Ravindran et al. |
| 2017/0046616 A1 | 2/2017 | Socher et al. |
| 2017/0357892 A1 * | 12/2017 | Lin ...................... G06N 3/0454 |
| 2018/0046649 A1 | 2/2018 | Dal Mutto et al. |
| 2021/0182613 A1 * | 6/2021 | Zhang ................... G06N 3/084 |

OTHER PUBLICATIONS

Sedaghat, Nima, et al. "Orientation-boosted Voxel Nets for 3D Object Recognition." arXiv preprint arXiv:1604.03351 (2016).
Zhi, Shuaifeng, et al. "LightNet: A Lightweight 3D Convolutional Neural Network for Real-Time 3D Object Recognition." In 3DOR. 2017.

* cited by examiner

THREE-DIMENSIONAL SHAPE CLASSIFICATION AND RETRIEVAL USING CONVOLUTIONAL NEURAL NETWORKS AND MAJORITY VOTE

BACKGROUND

Computer vision is the study of how to make computers understand digital images or videos. Youtube is a well-known video-sharing website. As of 2018, over 300 hours of video are uploaded to their website, youtube.com, every minute . . . that's five hours of video every second. It would be impossible for Youtube to hire enough people to sift through these videos for content, much less organize them or limit access, such as to young children.

This is where computer vision comes in. Computer vision is a field in which humans are enabling computers to understand digital images and video. Many different methods, some known as deep learning algorithms, have been developed to enable machines to acquire, process, and analyze digital images. Recently, convolutional neural networks are used for machine evaluation of visual imagery.

Three-dimensional (3D) object classification and identification are two disciplines involved with machine learning of visual data. 3D object identification/retrieval involves taking one or more images of an object and having the machine find a group or list of objects that are most similar to the given object. 3D object classification occurs when the machine determines what class of objects the object image or images belongs to. Thus, the two disciplines may work together. 3D object classification and identification/retrieval are challenges for computer vision in 3D object creation, printing, and digital manufacturing.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the examples described herein, a deep learning method employs a neural network having three sub-nets to classify and retrieve the most similar well-designed 3D model of an object, when given a rough 3D model or scanned images of the object. The most similar 3D model is present in a database and can be retrieved to use directly or as a reference to redesign the 3D model. The three sub-nets of the neural network include one dealing with object images and the other two dealing with voxel representations of the 3D object. To avoid the computational complexity of view pooling, majority vote is instead used. At a last stage, the results of all three sub-nets are combined to get the classification of the object. The second to last layer is used as a feature map to do feature matching and return a list of top N most similar well-designed 3D models.

Figure 1:
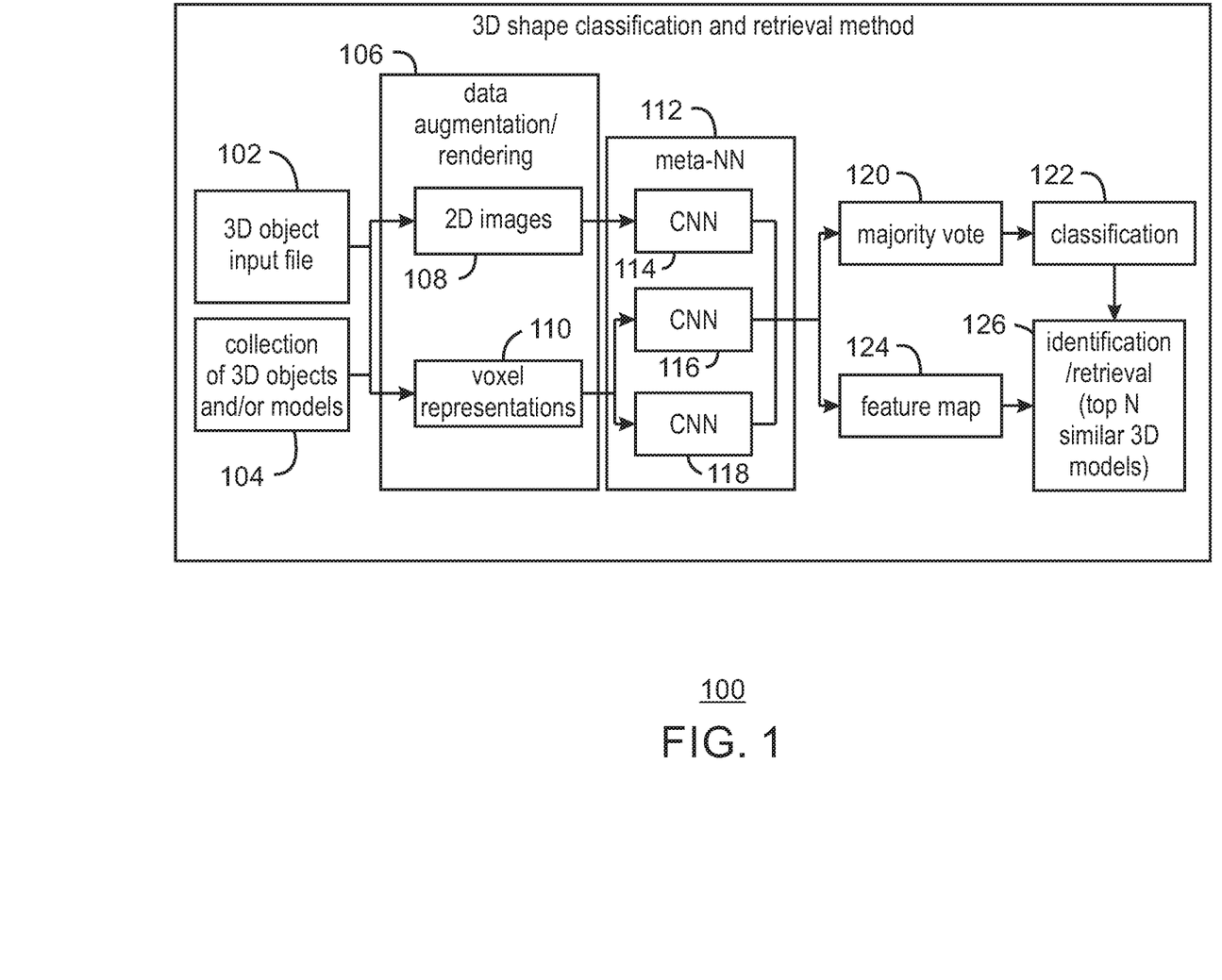
FIG. 1 is a schematic block diagram of a 3D shape classification and retrieval method, according to examples.

FIG. 1 is a schematic block diagram of a 3D shape classification and retrieval method 100, according to examples. The 3D shape classification and retrieval method 100 is a deep learning method employing multiple convolutional neural networks (CNNs). From a 3D object input file 102 representative of a target object received as input, the method 100 produces object classification 122 and list of top N 3D models 126 that are similar to the 3D object (identification/retrieval) as outputs. The method 100 also generates a feature map 124 at an intermediate step.

The 3D shape classification and retrieval method 100 classifies and retrieves the most similar well-designed 3D model of the target object, when given a rough 3D model or scanned images of the object. In one example, a well-designed 3D model is a model generated using Computer Aided Design (CAD) tools by design professionals. The most similar well-designed 3D model of the object may come from a collection of 3D objects and/or models 104.

The 3D shape classification and retrieval method 100 performs data augmentation/rendering 106 based on both the 3D object 102 (an input file describing the 3D object) and a collection of 3D objects and/or models 104. The input file may be from a rough design of the target object generated using a computer or captured by 3D cameras. The collection of 3D objects and/or models 104 is a collection of 3D shapes classified into different categories. 3D images of many different objects are in abundance, and efforts are made to collect and organize these objects. Shapenet.org, for example, is a collaboration to establish a dataset of shapes to enable research into computer graphics, computer vision, robotics, and other disciplines. The collection of 3D objects and/or models 104 facilitates training by the meta-NN 112.

The meta-neural network (meta-NN) 112 comprises three different neural networks, also known as sub-nets, shown as CNN 114, CNN 116, and CNN 118. As will be shown, the meta-NN 112 performs off-line training and real-time querying to generate the classification 122 and top N similar models 126 (the identification/retrieval) of the target object. The CNN 114, which receives 2D images 108, is also known herein as the image-based CNN, while the CNNs 116 and 118 receive the voxel representations 110, are also known herein as volumetric CNNs.

Figure 5:
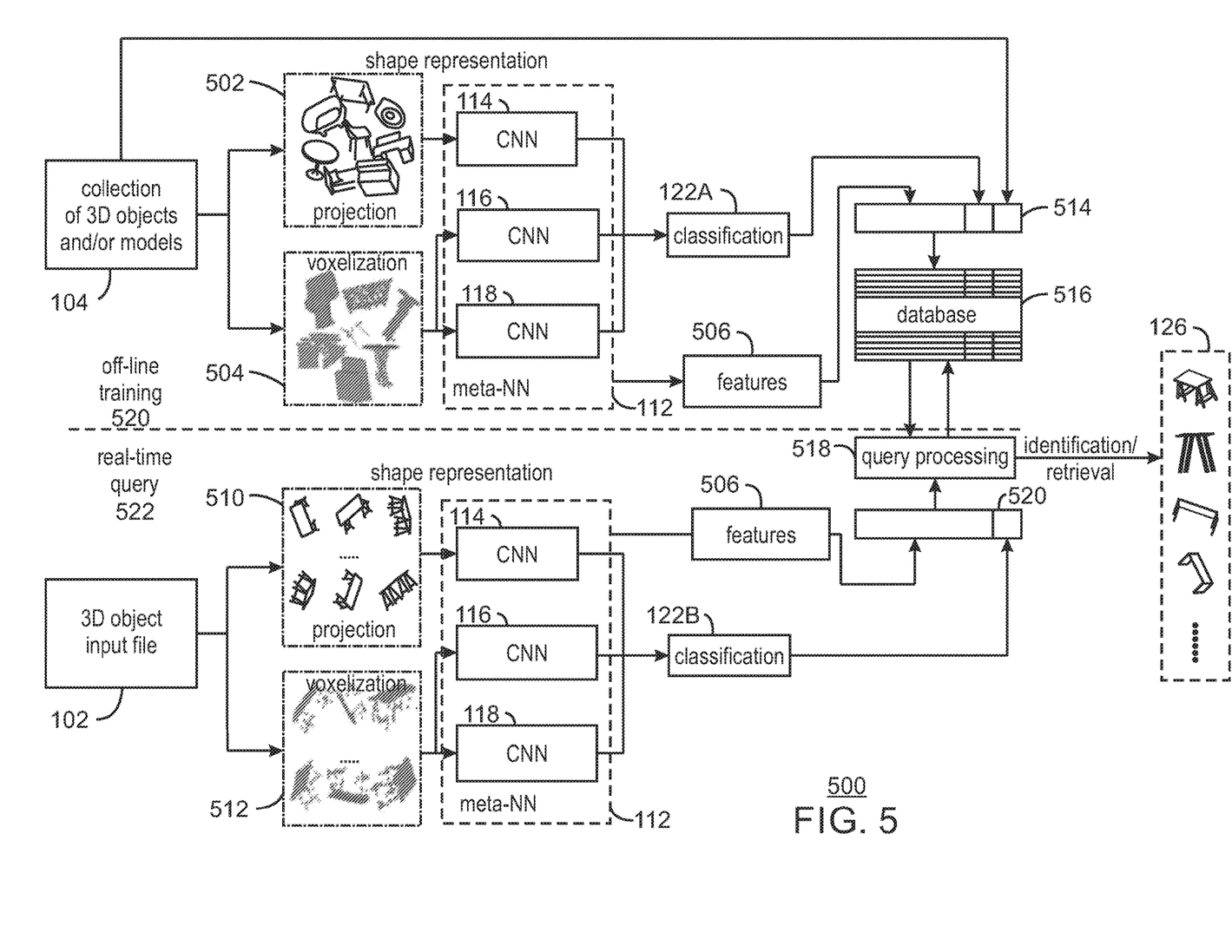
FIG. 5 is a flowchart showing offline training and real-time classification and retrieval performed by the 3D shape classification and retrieval method of FIG. 1, according to examples.

The CNN 114 receives object images 108 in the form of two-dimensional (2D) projection as inputs, while the other two, CNN 110 and CNN 112, receive voxel representations 110 as inputs. The 2D object images 108 are projected from the 3D object input file 102 of the target object and from the collection of 3D objects and/or models 104. Similarly, the voxel representations 110 are projected from the 3D object input file 102 of the target object and the collection of 3D objects and/or models 104. The data augmentation/rendering 106 performed by the 3D shape classification and retrieval method 100 is illustrated in FIG. 5, below.

At a last stage, the results of the three sub-nets are combined, resulting in the classification 122 of the target object. In an example, the classification 122 is obtained by majority vote 120. The result of classification 122 reduces the number of comparisons between the target feature map and the database feature maps. In contrast to neural networks that employ view pooling, majority vote is less computationally expensive, in some examples, and thus the 3D shape classification and retrieval method 100 may be adopted for applications in which computing power is to be conserved. Furthermore, the second to last layer of the sub-nets is used to generate the feature map 124 and return the identification/retrieval, a list of N most similar well-designed 3D models 126, for integer N. By combining the results of three deep CNNs, the 3D shape classification and retrieval method 100 provides a machine learning-based approach to address the challenge of 3D object classification and retrieval.

The 3D shape classification and retrieval method 100 includes both online and offline processing. The method starts with the rough 3D model 102, such as a scanned model, and searches for the most similar CAD model from what is already known (the collection 104). The collection 104 may include thousands or more of CAD models. Offline processing is used to train a pipeline that knows how to best represent the models using numbers, and also saves the representations (features) of the models. Then, when an unknown target object query occurs in real time, the object is put through the same pipeline to obtain its numeric representation. A simple numerical comparison between the training and the real time operations is made.

As the size of the collection of 3D objects and/or models grows, the time needed for comparison will grow linearly, in examples. Thus, the 3D shape classification and retrieval method 100 also adds classification as a way to partition the features into subgroups (classes). Then, when the comparison is performed, the amount of work may be reduced by comparing within the same class. So, starting with a rough 3D model of the target object, the method goes through the pipeline, and the most similar well-designed model, which is part of the collection 104, is generated as an output.

Figure 2:
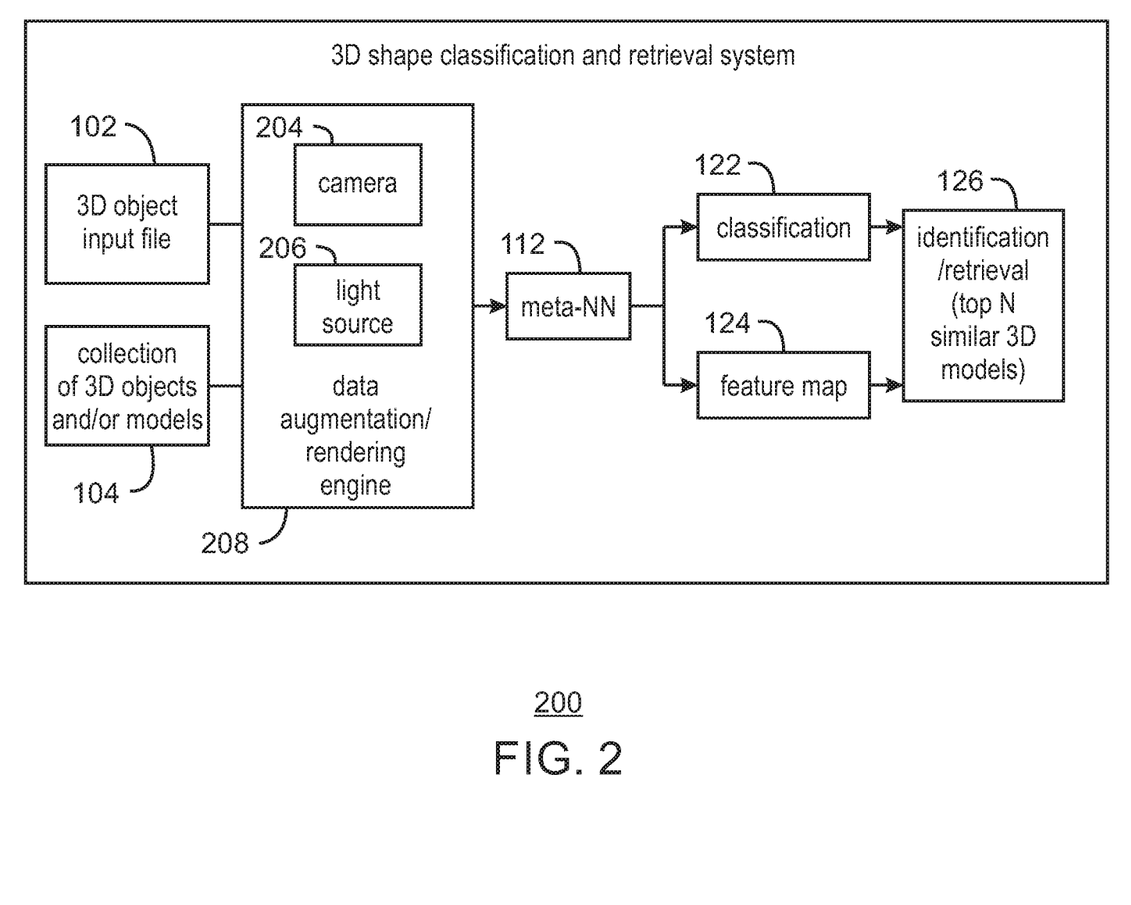
FIG. 2 is a simplified block diagram of a system to implement the 3D shape classification and retrieval method of FIG. 1, according to examples.

FIG. 2 is a simplified block diagram of a system 200 utilizing the 3D shape classification and retrieval method of FIG. 1, according to examples. The 3D object input file 102 and collection of 3D objects and/or models 104 are shown as inputs to a data augmentation engine 208, which generates the 2D images 108 and voxel representations 110 of FIG. 1. In one example, the data augmentation engine 208 includes a camera 204 and a light source 206 to generate the 2D images 108 of the target object. Where the input file 102 is received into the data augmentation engine 208, the input file 202 is a training model representative of the target object. The input file 202 may, for example, have coordinates of different vertices of the target object.

From the original 3D object input file 102, 2D images 108 of the target object are obtained (FIG. 1). These operations are performed by the data augmentation engine 208. In some examples, the camera 204 and light source 206 are used to render the 2D images 104 of the target object. In some examples, 360 2D images of the target object are obtained.

Similarly, from the collection of 3D objects and/or models 104, voxel representations 110 of the 3D objects in the shape database are generated by the data augmentation engine 208, although these operations do not involve the camera 204 and light source 206. In one example, viewing points are used to position each object so as to define voxelization coordinates (x, y, and z).

Typical objects generated by 3D printing can be the functional and aesthetic components of machines, consumer and industrial products that are manufactured in short runs of typically less than 1000 units, highly-customized and high-value products, and parts with complex internal and external 3D geometries.

Within a 3D printing ecosystem, object classification and identification have wide applications in 3D print content creation, production planning, as well as post-print parts packaging and assembly. When 3D printing is used in manufacturing, each print job may have different objects to be sent to different locations. Automatic identification of each object in such an environment facilitates its placement. The 3D shape classification and retrieval method 100 and system 200 may be useful in such an environment. Digital models of the different objects sent to the 3D printer comprise training data, and a 3D camera capturing the printed objects, as query objects, may be matched with its own digital model.

For 3D printing pre-processing, 3D shape retrieval can guide the printing process by providing nominal process parameters to optimize for printability, quality, and cost. After the print job, 3D shape retrieval can enable automation by tracking parts through post-processing and assembly stations. For example, on an assembly line, different parts will be received at a station to be assembled into the product. Upon recognizing the part name, guidance may be provided to the operator or robot to finish assembling the product. The 3D shape classification and retrieval method 100 and system 200 may be useful for these and other applications.

3D shape retrieval may be useful in a manufacturing setting. For example, a toy robot comprising several different parts may first be rough sketched, from which a rough version of a 3D model of the toy robot is made. Along with scanned data of other toy robots, a best model fit is made, the individual parts of the toy robot are manufactured. Using cameras disposed at a manufacturing facility, each of the individual parts of the toy robot may be tracked using 3D shape retrieval.

The "scanned data" in this scenario is an example of 3D print content creation. Given a physical object, a 3D scan of the object may have limited resolution or suffer from noise. The identification/retrieval pipeline of the 3D shape classification and retrieval method 100 may be used in the scanned data step to find a similar well-designed model. Thus, a simple robot design may be made using computer software, then the method 100 may supplement by retrieving a similar well-designed model.

The 3D shape classification and retrieval method 100 is able to render 3D models into images and voxels, ensuring that the rich 3D information is preserved in a lower resolution format. The neural network design provides flexibility on the number of views used during classification and retrieval.

As explained in the background section, 3D object identification/retrieval involves taking one or more images of an object and having the machine find a group or list of objects that are most similar to the given object. 3D object classification occurs when the machine determines what class of objects the object image or images belongs to. Classification and identification/retrieval may be independent of one another. In the 3D shape classification and retrieval method 100, classification is an intermediate step that helps to narrow the search space for retrieval.

Data Augmentation

Figure 3:
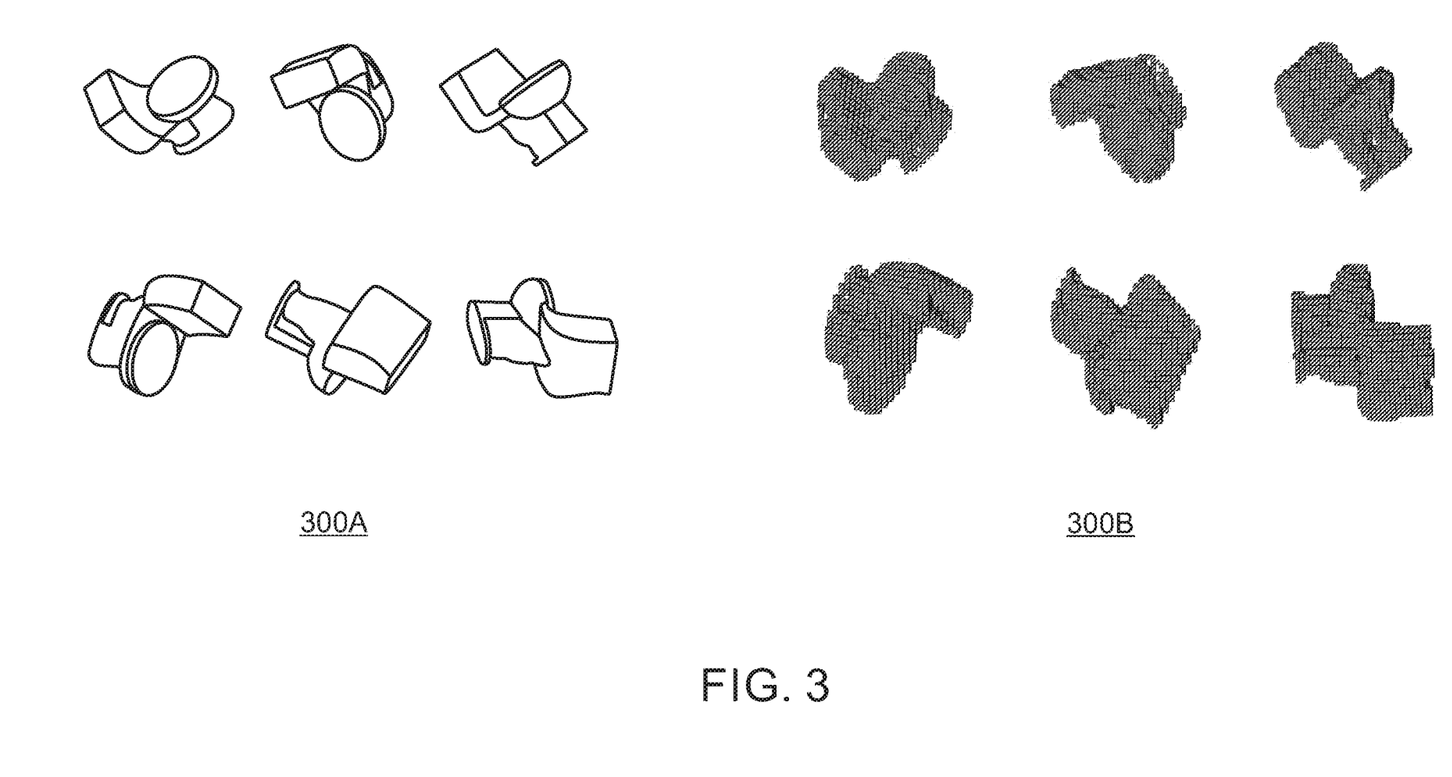
FIG. 3 shows two ways in which the 3D object is represented for the 3D shape classification and retrieval method of FIG. 1, according to examples.

FIG. 3 shows two ways in which the target object is represented for the 3D shape classification and retrieval method 100, according to examples. Two sets of images 300A and 300B of a target object, in this case, a toilet, are shown. Different viewpoints of the toilet result in different 2D projection images. The first set 300A are 2D image rendering of the toilet from six different viewpoints. These 2D images would, for example, be obtained by the data augmentation engine 208 using the camera 204 and light source 206. The second set 300B are voxel renderings of the toilet, also from six different viewpoints. For the anisotropic voxels, if the resolution of volumetric representation is high, these two sets 300A and 300B may look similar. If the resolution is low, the two sets may look quite different.

With the resolution of volumetric representation taken into account, the higher the resolution, the more time-consuming the method 100 operations will be. Thus, in one example, for the second set 300B, 30×30×30 voxels are used represent the target object.

Figure 4:
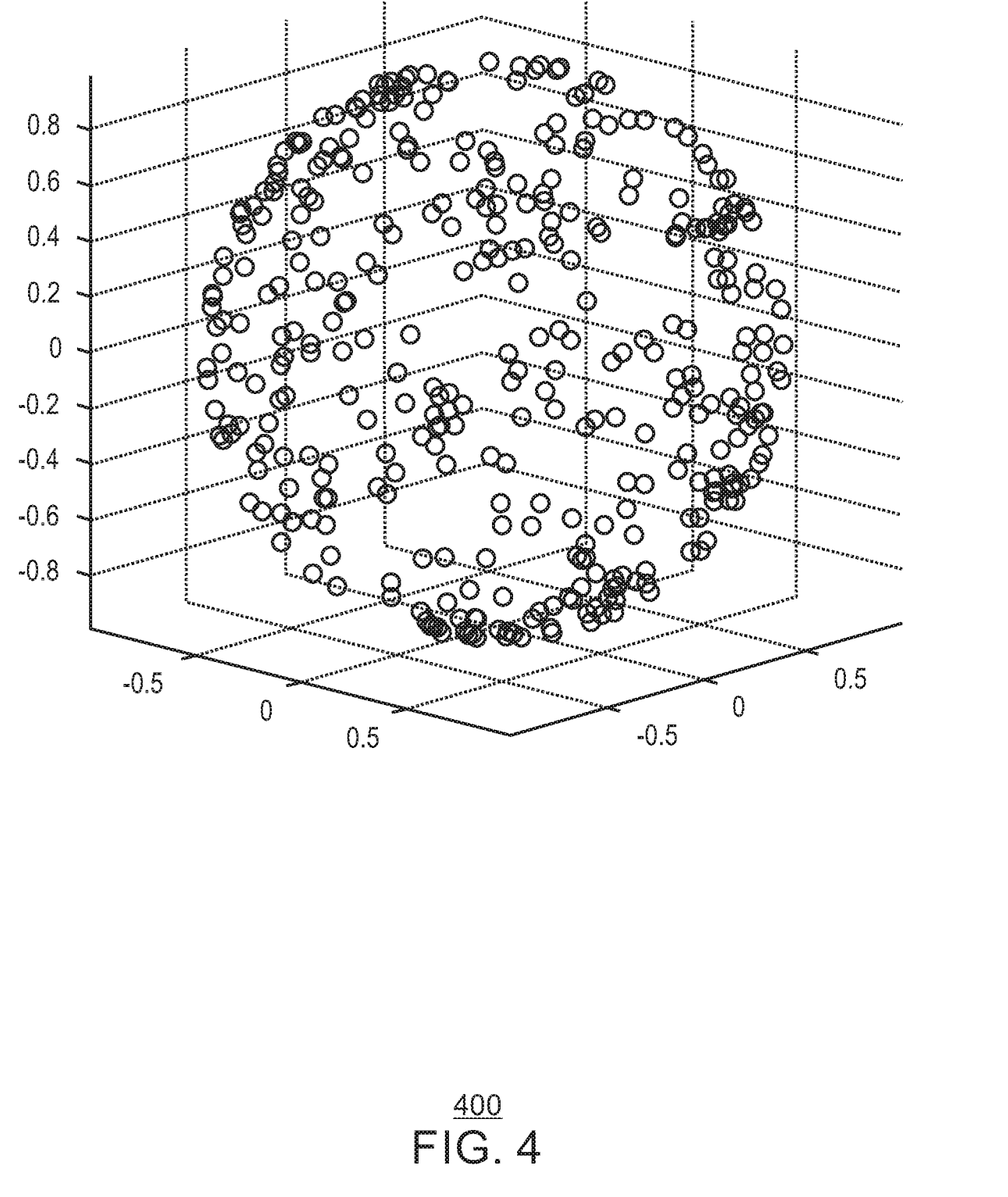
FIG. 4 shows a graph including viewpoints for imaging the 3D object by the 3D shape classification and retrieval method of FIG. 1, according to examples.

FIG. 4 shows a graph 400 including viewpoints 402 for imaging the target object, according to examples. The graph 400 features 360 different viewpoints which, in one example, are randomly generated, with the viewpoints being evenly distributed on a sphere pointing toward the centroid of the mesh. From FIG. 2, the imaging of the target object is done by the camera 120 and light source 122 in the data augmentation engine 208. In some examples, the direction of the light source 206 when imaging the target object is fixed. In one example, the light source 206 is fixed to the viewing direction of the target object. In another example, the light source 206 is fixed to the Cartesian coordinates of the graph 400.

In one example, from the 360 views, the 3D shape classification and retrieval method 100 selects a smaller number of views to be trained by the meta-NN 112. The number of views may be any number up to 360 views. In some examples, the number of views selected are 36, 60, 90, 120 or 360.

FIG. 5 is a flowchart showing offline training 520 (top) and real-time query 522 (bottom) performed by the 3D shape classification and retrieval method 100, according to examples. In the example illustration, the target object is a table. Recall from FIG. 1 that the data augmentation/rendering 106 generates 2D images 108 and voxel representations 110. In FIG. 5, the 2D images comprise the 2D projections 502 of a variety of objects from the collection of 3D objects and/or models 104 in FIGS. 1 and 2) and the 2D projections 510 of a single object, the table. Similarly, the voxel representations 110 comprise the voxelizations 504 of the variety of objects and the voxelizations 512 of the table.

The off-line operations 520 are involved with training the meta-NN 112. Looking at the off-line training 520, from the collection of 3D objects and/or models 104, a number of different objects, such as table, chair, bathtub, toilet, and so on, are converted into the 2D projections 502 and 3D voxelizations 504. The CNN 114 does feature extraction from the projection data 502. Simultaneously, the CNN 116 and CNN 118 do feature extraction from the voxelization data 504. From the three neural networks, features 506 are obtained and saved.

The three neural networks, CNN 114, CNN 116, and CNN 118, or meta-NN 112, process the 2D projections and 3D voxelized data separately. Thus, in the off-line training 520, the 2D projections 502 are processed by the image-based CNN 114 and the 3D voxelizations 604 are processed by the volumetric CNNs 116 and 118. Likewise, in the real-time query 522, the 2D projections 510 are processed by the image-based CNN 114 and the 3D voxelizations 512 are processed by the volumetric CNNs 116 and 118.

Still in the off-line portion 520, classification 122A, which is a numerical value, is also generated by the meta-NN 112. This classification 122A is not of the target object, but of the objects from the collection of 3D objects and/or models 104. A database block 516 includes the collection 104, the features 506, and the class labels calculated by the meta-NN 112 from training models. The original models are for displaying the top N results.

For the real-time query operations 522, at the bottom of the figure, the 3D shape classification and retrieval method 100 receives the 3D object input file 102 (FIGS. 1 and 2) from which the 2D projections 510 and 3D voxelizations 512 of the target object are made. In examples, the input file 202 is a training model representative of the 3D object, the table. In this example, the projections 510 are 2D images of the 3D object, a table, at a number of different viewpoints. Similarly, the voxelizations 512 are voxel representations of the table of a predefined volume, such as 30×30×30 voxels, again from a number of different viewpoints.

During the real-time query 522, the meta-NN 112 performs feature extraction, with the CNN 114 using the projection data 510 and the CNNs 116 and 118 using the voxelization data 512, but, in this portion of the operations, the data being processed is for the table alone. From this, classification 1228 of the 3D object is performed. The classification 1228 is a numerical representation of the class in which the target object fits. So, if the database block 516 has several different classes of objects, and the table class is the third class, the classification 114B would be a 3, indicating that the 3D object is from the table class.

The output from the meta-NN 112 forms one or multiple query entries, depending on how many views of the target object are used. The query entries include the features for all views and the class label they have agreed upon.

A query processing unit 518 queries the entries in the database 516. The query processing unit 518 will obtain a subset of the database features (from the features 506) according to the class label (from classification 122B), then will compare query features with the subset, and find the most similar model 126 in the database 516. The final list 126 is based on a majority vote of the results from the query features. In FIG. 5, the majority vote is considered part of both the classification blocks 122 and the query processing block 518.

Further, feature comparison is performed, using both the offline 520 and real-time 522 data. The feature comparison of the table is compared to the saved features 506 from the off-line 520 training. From the feature comparison, a re-ranking is performed, resulting in the top N most similar tables 118. The features saved 506 from the off-line training 520 are re-ranked here, according to their similarity to the target table. In one example, the saved feature 506 is an abstract numerical vector.

Re-ranking is part of the query processing 518, in some examples. The query processing operates on a given query and the database 516. The query processing may narrow the search by the class label. Then, based on a similarity measure to find items that meet a threshold. With the similarity measure and the given class, the query-processing unit 518 may re-rank the items before output.

During the off-line training 520, the neural networks are fed with lots of different kinds of objects from both the projection 502 and the voxelization 504. With the real-time query 522, one object at a time, the table in this example, is fed into the meta-NN 112 from both the projection 510 and the voxelization 512. It is possible, however, that real-time retrieval of multiple objects, not just the table, may be fed into the meta-NN in parallel, such as where sufficient computing power is available.

Further, the neural networks of the meta-NN 112 are learning their parameters during the off-line training 520. Thus, in some examples, the projections 502 and voxelizations 504 are rich with examples of different kinds of objects. During the real-time retrieval 522, the meta-NN 112 is already well-trained, in some examples, and is thus mature enough to make decisions on new objects not previously received.

Figure 6:
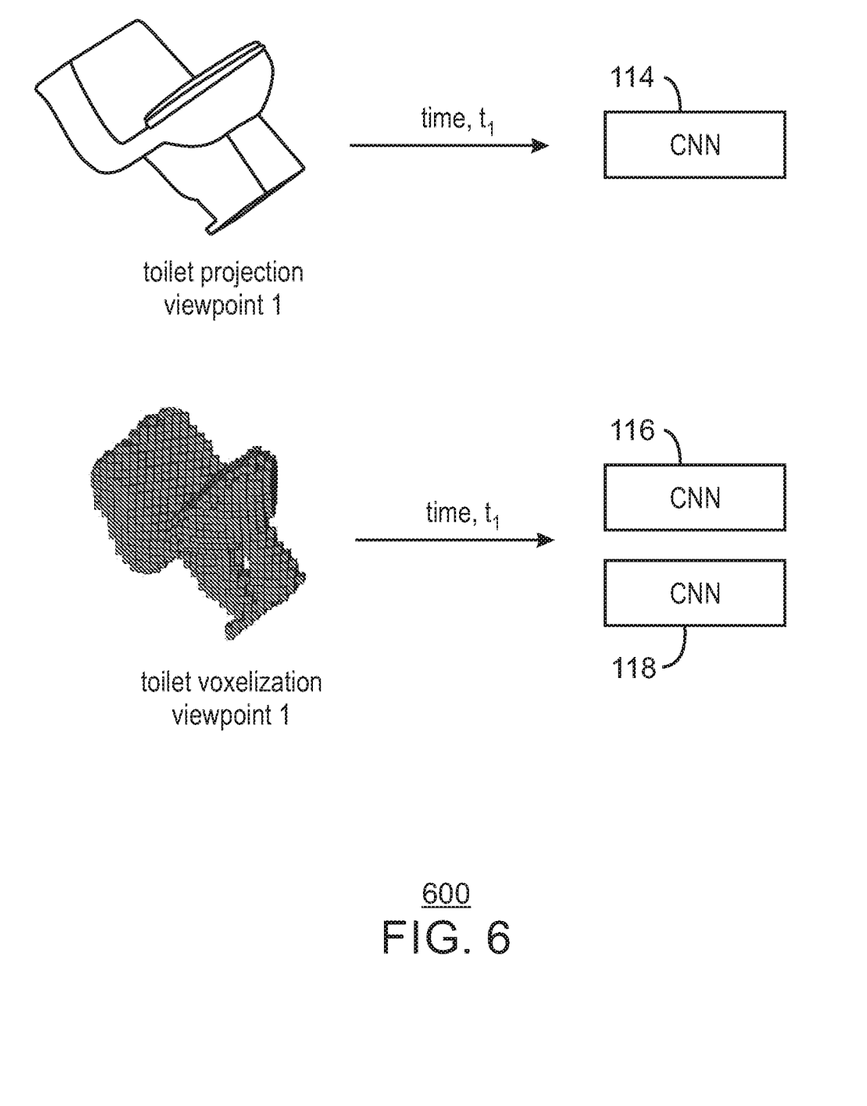
FIG. 6 illustrates one principle of the 3D shape classification and retrieval method of FIG. 1, according to examples.

Also, one thing that is not apparent in FIG. 6 is that the CNNs of the meta-NN 112 are learning their parameters during off-line training 520, and the more different kinds of objects making up the projection 502 and voxelization 504, the better the training, in some examples. In the real-time retrieval 522, the CNNs are already well-trained, and thus the meta-NN 112 is mature enough to make decisions on new heretofore unseen objects, such as the table. So, although the depiction in FIG. 6 shows the same meta-NN 112 in both the off-line training portion 520 and the real-time query portion 522, the meta-NNs are at different states, such as, for example, getting mature in the off-line training portion and already mature in the real-time query portion.

The classification 122A and 1228 are both numerical values, which could be any class defined in the training. The result of the classification 1228 may be an input for feature comparison 518, in one example, so that training features from the same class are compared.

FIG. 6 illustrates one principle of the 3D shape classification and retrieval method 100, according to examples. Data generated from the same viewing angle are put through the neural networks at the same time for both the off-line training 520 and the real-time query 522, in one example. Where the projection data 502 features a toilet from six different viewpoints, 1-6, and the voxelization data 504 features a toilet from the same six different viewpoints, 1-6, the projection toilet from viewpoint 1 is fed into the CNN 114 at the same time as the voxelization toilet from viewpoint 1 is fed into the CNN 116 and CNN 118.

Further, with the 3D shape classification and retrieval method 100, the class/model that receives the highest number of votes among all viewing angles, shown as majority vote 120, is selected as the final output, the classification 122B. In an example, the majority vote 120 is also used for the feature comparison 518.

Majority Vote

Typically, neural networks will include a stage called view pooling, to consider different representations in multiple viewpoints. In contrast, the 3D shape classification and retrieval method 100 uses majority vote rather than view pooling. In FIGS. 1 and 5, the majority vote 120 is taken to generate the classification 122. By using majority vote, the number of views for the target object is more flexible, in an example. Further, the number of training parameters may be lower with majority vote than with view pooling.

Returning to FIG. 5, in the off-line training 520, the 3D shape classification and retrieval method 100 generates multi-views of images and voxels for 3D objects for training. In the real-time testing stage 522, the majority vote operation takes place at the end of a Softmax layer. Softmax is a type of normalized exponential function that may be executed at the end of a neural network. In FIG. 6, the classification 122B is based on a majority vote of classifications produced by the meta-NN 112.

Once both the off-line 520 and real-time 522 portions have been run, there is an identification/retrieval stage. In one example, the second to last layer of the meta-NN 112 is treated as features. A feature comparison between the target object feature and the classified class features is done at this stage. The method 100 calculates the distance between the features from the training portion 620 for the decision class, that is, the class identified by the classification 122B. Thus, for each view, there is a closest view of some object in the training set, and the distance calculation is thus done for each view. For example, if the classification 122B is 3, then the features from class 3 are compared with the feature of the target object. If the top N list which comes from class 3 is not satisfactory, then comparison may be made with other classes.

In an example, "other" refers to a top k classes for integer k. After the Softmax layer, a probability that, for each class, the target object belongs in the class, is obtained. The classification 1228 is the class with the highest probability, but, in some examples, the top k maximum probability is obtained (k=1, 2, 3, . . . ). So, for the re-ranking, the method 100 does the feature comparison with the features coming from these top k classes.

A majority vote is then obtained for some object in the decision class. In some examples, the majority vote dramatically increases the accuracy of the method 100 operations.

Figure 7:
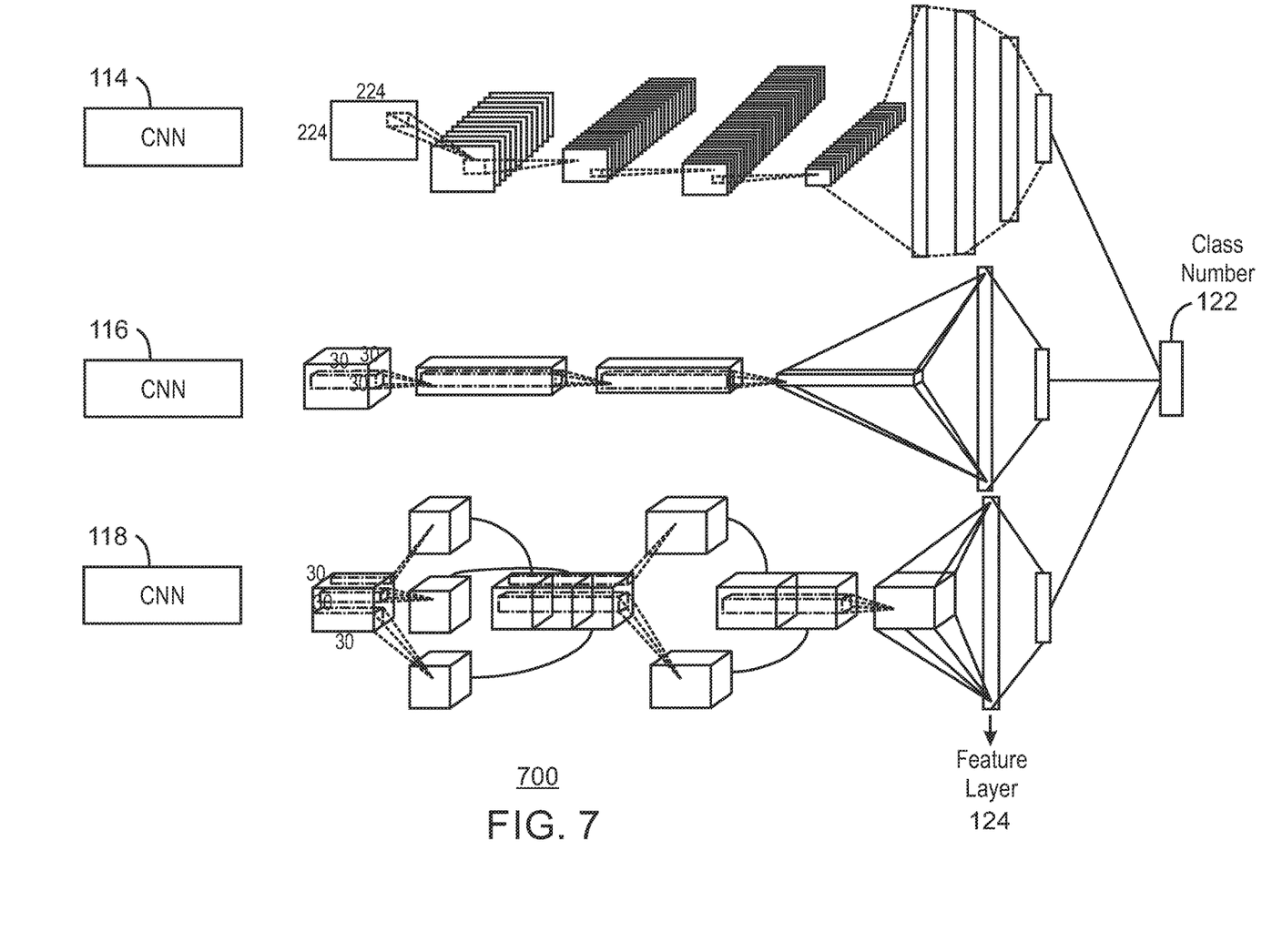
FIG. 7 is a diagram of computational graphs representing the three CNNs making up the meta-CNN of the 3D shape classification and retrieval method of FIG. 1, according to examples.

FIG. 7 is a diagram of computational graphs representing the three CNNs making up the meta-CNN of the 3D shape classification and retrieval method 100, according to examples. The details of the computational graphs are beyond the scope of this disclosure. Nevertheless, it can be observed that the CNN 114, the image-based CNN, receives a 2-dimensional input, while the CNN 116 and CNN 118, the volumetric CNNs, receive 3D inputs. The classification number 122 is the final output of all three neural networks, and the feature layer 124 is obtained in the second-to-last layer of the operations.

Image-Based CNN (CNN 114)

In the 3D shape classification and retrieval method 100, in the image-based CNN 114, any of a number of available CNNs may be used to do the training. In one example, a published neural network, with some modifications, is used as the CNN 114. Instead, the method 100 renders multiple 2D projections of CAD models, as described above, represented in a polygon mesh (see FIG. 4). Since the CAD model does not contain color information, the 2D projections are gray-scale images, such as the toilets 400A in FIG. 3 and the projection images 502 and 510 in FIG. 5. In one example, the direction of the light source 206 when imaging the 3D object 102 is fixed, such as is described in FIG. 2.

Volumetric CNN (CNNs 116 and 118)

In the 3D shape classification and retrieval method 100, two well-defined CNNs are used for volumetric data, which forms a large feature space by using the majority vote across multiple views. The work is similar to what is happening with the image-based CNN, but uses 2D convolutions to aggregate useful information across a direction of the object.

VCNNI (CNN 116)

The first volumetric CNN, tries to mimic the working principle of x-ray scanning by using an anisotropic probing method, a kernel with size, k×k×length, along a fixed direction. The size, k, may be selected based on the input voxels size. In some examples, k is 1, 3, or 5. The volumetric CNN 116 consists of three 2D convolution layers and two fully connected layers. The final layer of the volumetric CNN 116 works as a classifier, where the size is equal to the number of classes in the training dataset.

VCNNII (CNN 118)

The second volumetric CNN 118, concatenates outputs from different kernel (filter) sizes, so the key feature across multiple scales is maintained. In some examples, the kernel sizes used by the method 100 are 1×1, 3×3, and 5×5. The 1×1 kernel is to abstract information in the receptive field and encodes a higher representational power without much additional computational cost, in one example. Since the volumetric data for the 3D shape classification and retrieval method 100 is not very large, the computational complexity is less of a concern than for neural networks analyzing enormous data sets.

The second volumetric CNN 118 contains two inception modules, followed by a convolutional layer and two fully connected layers. The inception modules apply the multiple kernel sizes, does each convolution in parallel, and concatenates the result feature map before going to the next layer. In the inception modules, multiple sized features are contained, and the model helps to decide which one works best. In the fully connected layer, neurons have full connection to all activation in the previous layer. So, in one example, the fully connected layer is computed as a matrix multiplication followed by a bias offset.

Empirical Results

The method 100 was applied on the Princeton ModelNet dataset, which contains 127,915 CAD Models within 662 object categories. The dataset also has two widely used subsets, ModelNet10 and ModelNet40. ModelNet10 contains ten popular object categories, with a total of 3,991 training CAD models and 908 testing models. In one example, these models are manually aligned. ModelNet40 contains 40 distinct classes with a total of 9,843 training models and 2,468 testing models. Further, the method 100 utilizes the same train-test split provided by the Princeton Modelnet authors, and tested our method on the ModelNet10 subset. The 3D CAD models in ModelNet dataset are in the form of a polygon mesh, containing coordinates and all the vertices in the mesh and the identifier of each node forming a polygon.

Figure 8:
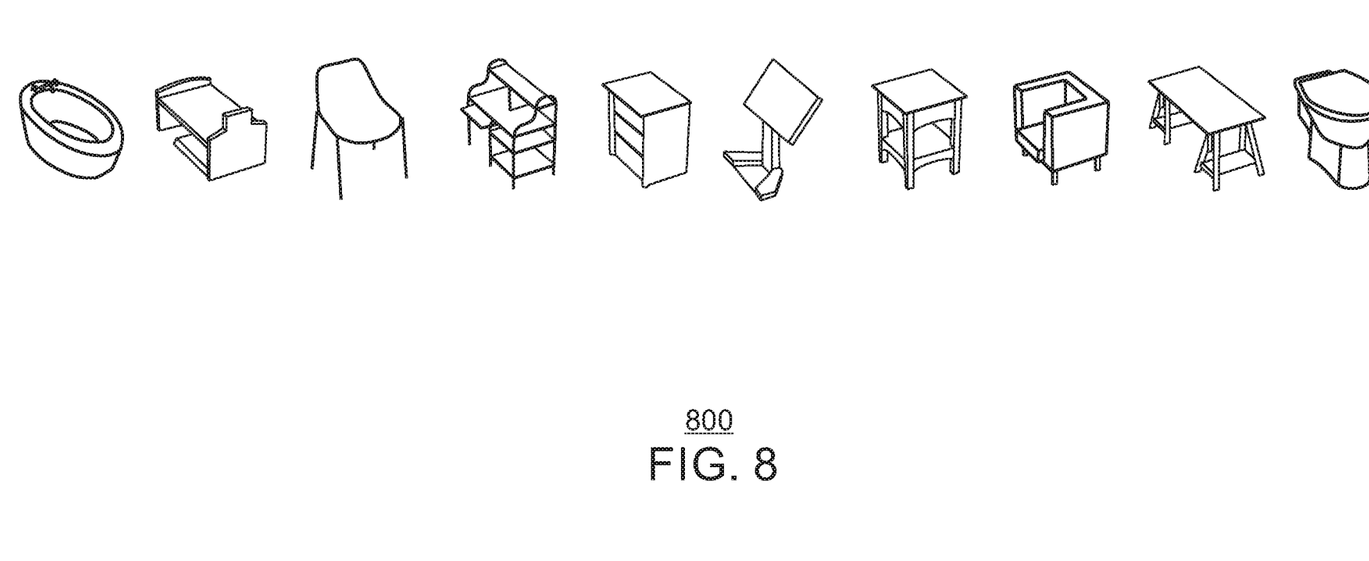
FIG. 8 shows the 2D images of the objects listed in Table 1, according to examples.

Table 1 is a list of the object classes and the number of training and testing objects in each class of the ModelNet10 dataset. FIG. 8 shows the 2D images of the objects listed in Table 1, according to examples.

TABLE 1

| ModelNet10 dataset | | | | | | | | | | |
|---|---|---|---|---|---|---|---|---|---|---|
| | bathtub | bed | chair | desk | dresser | monitor | night stand | sofa | table | toilet |
| training | 106 | 515 | 889 | 200 | 200 | 465 | 200 | 680 | 392 | 344 |
| testing | 50 | 100 | 100 | 86 | 86 | 100 | 86 | 100 | 100 | 100 |

Table 2 shows the comparison of the classification accuracy of the 3D shape classification and retrieval method 100 with other neural network implementations proposed in the research community.

TABLE 2

| Result comparison | | |
|---|---|---|
| # of viewing points | algorithm | ModelNet10 classification (accuracy) |
| 120 | method 100 | 93.03% |
| N/A | Panorama-NN | 91.1% |
| NA | 3DShapeNets | 83.5% |
| 20 images & 60 voxels | FusionNet | 93.11% |

With 120 views, the Meta-NN approach of the method 100 achieves an accuracy of 93.03%. Thus, the results for the 3D shape classification and retrieval method 100 is close to the results for FusionNet and yet offers more flexibility for industry applications, in some examples. When evaluating a system's performance for 3D object retrieval, the 360 viewpoints of the same 3D model are divided into training and testing. In this manner, there is background information for each testing sample. The retrieval accuracy of the method 100 for the bathtub class is 87.13%, for example.

Figure 9:
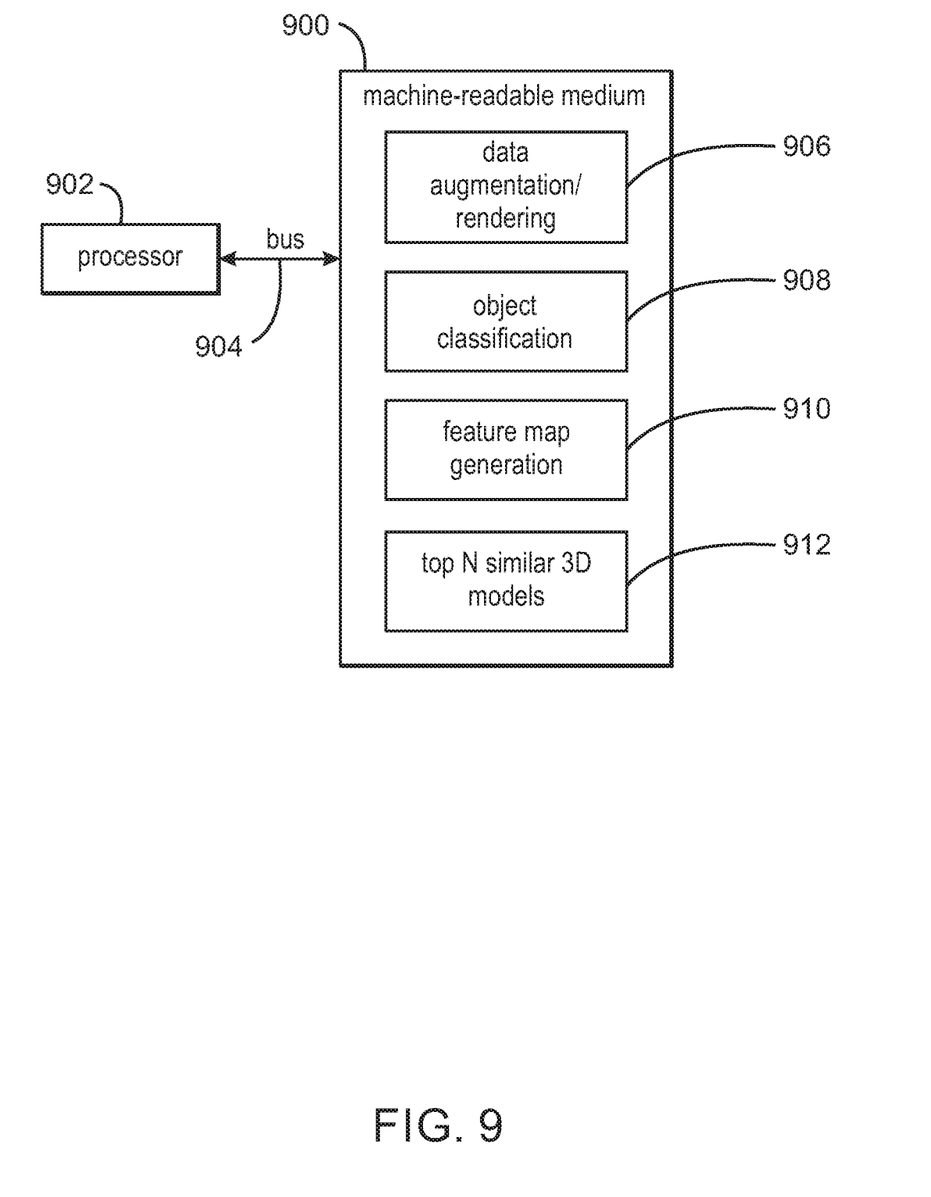
FIG. 9 is a block diagram of a non-transitory, machine-readable medium for performing the 3D shape classification and retrieval method of FIG. 1, according to examples.

FIG. 9 is a block diagram of a non-transitory, machine-readable medium for performing the 3D shape classification and retrieval method of FIG. 1, according to examples. A processor 902 may access the non-transitory, machine readable medium over a reader mechanism, as indicated by arrow 904. The non-transitory, machine readable medium 900 may include code to direct the processor 902 to implement operations for performing the 3D shape classification and retrieval method of FIG. 1. The code may perform data augmentation 906, such as to generate the 2D images and voxel representations obtained from the 3D object and the 3D shape database. The code may perform object classification 908, in which the meta-NN takes the 2D images and voxel representations and simultaneously runs the image CNN and volumetric CNNs to classify the 3D object received. The code may perform feature map generation 910 using the second-to-last layer of the meta-NN. And, the code may generate N top 3D models that are similar to the 3D object.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A method to classify a three-dimensional (3D) object comprising:
    capturing a plurality of two-dimensional (2D) views of the 3D object into first 2D projections and first voxel representations of the 3D object;
    capturing a second plurality of 2D views of a plurality of different objects into second 2D projections and second voxel representations, wherein the plurality of different objects is obtained from a 3D shape database;
    running a meta-neural network comprising first, second, and third convolutional neural networks (CNNs), by:
        applying the first CNN on the first and second 2D projections;
        applying the second and third CNNs on the first and second voxel representations;
    wherein the 2D projections and voxel representations are processed separately;
the meta-neural network to identify the 3D object from the plurality of different objects based on a majority vote and assigns a classification of the 3D object in the 3D shape database, wherein the classification of the 3D object enables machine-based tracking of the 3D object in a manufacturing facility.

2. The method of claim 1, further comprising:
    training parameters of the meta-neural network by:
        selecting a predetermined number of the plurality of 2D views of the 3D object; and
        generating the first and second voxel representations of objects retrieved from the 3D shape database;
wherein the parameters enable the meta-neural network to select the classification.

3. The method of claim 2, wherein the predetermined number is selected from a group consisting of 36, 60, 90, 120, and 360.

4. The method of claim 2, further comprising:
    sorting the target objects into a plurality of classes; and
    performing identification/retrieval of a list of top N most similar 3D models from the 3D shape database by generating a feature map of each of the plurality of classes.

5. The method of claim 1, wherein data generated from a same viewing angle are processed by the first, second, and third CNNs at the same time.

6. The method of claim 1, wherein the majority vote comprises the highest number of votes among all viewing angles.

7. A system to generate a classification number associated with a three-dimensional (3D) object, the system comprising: a meta-neural network, comprising: a first convolutional neural network (CNN) to process a plurality of 2D image renderings of the 3D object and a plurality of other 2D renderings of other 3D objects not including the 3D object; second and third CNNs to process a plurality of 3D voxel renderings of the 3D object and plurality of other voxel renderings of the other 3D objects, wherein the processing of all three CNNs comprises training, classification, and identification; wherein the system enables automatic identification of the 3D object among a plurality of other 3D objects in a manufacturing facility.

8. The system of claim 7, further comprising:
    a 3D camera to capture a predetermined number of views of the 3D object, resulting in:
        the plurality of two-dimensional (2D) image renderings of the 3D object, the plurality of 2D image renderings comprising a first 2D image rendering from a viewing angle; and
        the plurality of voxel renderings of the 3D object, the plurality of voxel renderings comprising a first voxel rendering from the viewing angle;
wherein the first 2D image rendering and the first voxel rendering are processed simultaneously.

9. The system of claim 7, further comprising a light source for capturing the predetermined number of views, wherein the light source is in a position fixed to the viewing direction of the 3D object.

10. The system of claim 7, wherein the second CNN comprises:
    three 2D convolution layers; and
    two fully connected layers, a first fully connected layer and a second fully connected layer, wherein the second fully connected layer comprises a classifier.

11. The system of claim 7, wherein the third CNN comprises:
    two inception modules;
    one convolution layer; and
    two fully connected layers.

12. A non-transitory, computer-readable medium comprising instructions executable by a processor to:
    capture a plurality of two-dimensional (2D) views of the 3D object into a 2D projection of the 3D object;
    run a meta-neural network comprising first, second, and third convolutional neural networks (CNNs), by:
        applying the first CNN on the 2D projections;
        applying the second and third CNNs on voxel representations, wherein the 2D projection and 3D voxel representation are processed separately to generate data;
    select a classification of the 3D object based on a majority vote; and
    performing identification/retrieval of a list of top N most similar 3D models based on the classification
wherein the classification and identification/retrieval of the 3D object enables post-print packaging and assembly of the 3D object.

13. The non-transitory, computer-readable medium of claim 12, further comprising instructions executable by the processor to train parameters of the meta-neural network by:
    selecting a predetermined number of the plurality of 2D views of the 3D object; and
    generating the voxel representations of target objects retrieved from a 3D shape database;
wherein the parameters enable the meta-neural network to select the classification.

14. The non-transitory, computer-readable medium of claim 12, further comprising instructions executable by the processor to:
  sort the target objects into a plurality of classes; and
  generate a feature map of each of the plurality of classes, wherein the feature map provides a list of top N most similar 3D models from the 3D shape database.

15. The non-transitory, computer-readable medium of claim 12, wherein data generated from a same viewing angle are processed by the first, second, and third CNNs at the same time.

* * * * *